US007865765B2

(12) United States Patent
Trevathan et al.

(10) Patent No.: US 7,865,765 B2
(45) Date of Patent: *Jan. 4, 2011

(54) GRID LICENSING SERVER AND FAULT TOLERANT GRID SYSTEM AND METHOD OF USE

(75) Inventors: Matthew B. Trevathan, Kennesaw, GA (US); Seth Chisamore, Atlanta, GA (US); Christopher E. Holladay, Marietta, GA (US); Michael P. Outlaw, Dallas, GA (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

This patent is subject to a terminal disclaimer.

(21) Appl. No.: 11/148,872

(22) Filed: Jun. 9, 2005

(65) Prior Publication Data

US 2006/0282519 A1 Dec. 14, 2006

(51) Int. Cl.
*G06F 11/00* (2006.01)
(52) U.S. Cl. ............................................................ 714/4
(58) Field of Classification Search .................... 714/4
See application file for complete search history.

(56) References Cited

U.S. PATENT DOCUMENTS

| 6,038,565 | A | 3/2000 | Nock |
| 6,108,420 | A * | 8/2000 | Larose et al. ................. 705/59 |
| 6,499,049 | B2 * | 12/2002 | Waldo et al. ................ 718/104 |
| 6,591,272 | B1 | 7/2003 | Williams |
| 6,947,986 | B1 * | 9/2005 | Huang et al. ................. 709/225 |
| 7,222,106 | B2 * | 5/2007 | Block et al. .................... 705/59 |
| 2004/0246921 | A1 * | 12/2004 | Bates et al. ................... 370/329 |
| 2005/0086174 | A1 * | 4/2005 | Eng ............................... 705/59 |
| 2006/0136360 | A1 * | 6/2006 | Gebhart et al. ................. 707/1 |

(Continued)

FOREIGN PATENT DOCUMENTS

CN 1595903 3/2005

(Continued)

OTHER PUBLICATIONS

Owner/Usser in Computation Grid Extension by Non-dedicated Resources by Goran Martinović, Nov. 9-12, 2003.

(Continued)

*Primary Examiner*—Bryce P Bonzo
(74) *Attorney, Agent, or Firm*—Anna Linne; Roberts Mlotkowski Safran & Cole, P.C.

(57) ABSTRACT

A system and method for managing licensed and non-licensed resources in a grid network is provided. A license server receives and processes requests for a license and determines whether a license is available and, if necessary, causes a new configuration to be created on a server for satisfying the request. A new grid node may also be created and configured to be added to the grid for creating additional capacity for grid processing. The configuration may be performed at a time prior to an actual need by the grid, perhaps due to a faulted node, and quickly brought on-line with a simple configuration update. The new grid node may also have a virtual IP address reassigned to quickly redirect processing from the faulted node to the newly configured node. Also, an external resource dispatcher may add new resources such as storage or processing capacity to the grid and may coordinate the new resources with the license server.

23 Claims, 8 Drawing Sheets

U.S. PATENT DOCUMENTS

2007/0250608 A1* 10/2007 Watt .......................... 709/222
2008/0216132 A1* 9/2008 Liu et al. ...................... 725/86
2008/0229322 A1* 9/2008 Berstis et al. ............... 718/106

FOREIGN PATENT DOCUMENTS

EP          1515231 A2    3/2005

OTHER PUBLICATIONS

Applying Conflict Management Strategies in BDI Agents for Resource Management in Computational Grids by Omer F. Rana, 2001.

Requirements Interaction Management by William N. Robinson, Jun. 2003.

* cited by examiner

GRID LICENSING SERVER AND FAULT TOLERANT GRID SYSTEM AND METHOD OF USE

FIELD OF THE INVENTION

The invention generally relates to a system and method for providing a fault tolerance in a grid based computer system and, more particularly, to a system and method for providing fault tolerance in a grid based computer system and flexibly managing application licenses in the grid based system.

BACKGROUND DESCRIPTION

In grid based computer system, when a server in the grid goes off-line, applications that were served by the off-line server are no longer available from that server. Requests for the applications once served by the off-line server may not be serviced or a new server with the requested application must be located with a valid license.

Moreover, when a server reaches a limiting threshold such as computing power, memory, storage, external limiting factor, or the like, there is no orderly process to add additional resources in anticipation of the threshold or as a result of reaching the threshold. Flexibly adding new resources to the grid in view of the threshold or releasing the resources when no longer required typically does not occur with much transparency or without disruption to a process somewhere in the grid.

Adding additional resources to the grid typically requires validation of the new resource. For example, a new server with an appropriate resource may not be able to be added to the grid because the server has no valid license for the resource. Alternatively, a license typically has an associated metering required to assure that instances of a resource do not exceed a pre-determined limit, typically according to the terms of the license. In a grid system, the metering of resources becomes problematic when host machines or servers become unavailable or reach a performance limit. Adding new application resources for availability to the grid from alternate servers usually necessitates a reconciling of license terms (i.e., metering or instance counts) for the given resource.

However, little transparency currently exists to provide for dynamically adding and removing resources in the grid in response to demands for licensed applications (and in certain instances "non-licensed" resources) so that the demands are met while also detecting faults in one or more grid components (e.g., application servers) and dynamically adjusting for the faults transparently by adding (or removing) new resources to the grid according to available license limits. Thus, adding or removing of resources should be transparent to an application requestor and grid operations overall, and be reconciled according to licensing limits.

SUMMARY OF THE INVENTION

In an aspect of the invention, a method for managing operations in a grid computing system is provided. The method comprises the steps of creating one or more generic nodes from a master node by transferring an image to the one or more generic nodes from the master node and transforming the one or more generic nodes into one or more operational nodes by sending a configuration update to each of the one or more generic nodes, the configuration update providing information to create a uniquely identified one or more operational nodes within a grid network.

In another aspect of the invention, a method for managing applications in a grid computing system is provided. The method comprises the steps of receiving a license request for a resource, checking cache to determine whether the resource is available and, if available in cache, returning a response indicating that the cached resource is available with a license, and if not available in cache, locating the resource from a non-cached location and authorizing the resource for use according to a license appropriate for the resource and returning a response identifying the resource's availability.

In another aspect of the invention, a method of acquiring resources in a grid system is provided. The method comprises receiving a request for a resource from one node of a plurality of nodes in a grid, identifying a resource suitable for satisfying the request and attaching the resource to the grid for use by at least the one of a plurality of nodes for processing one or more applications in the grid.

In another aspect of the invention, a method of acquiring resources in a grid system is provided. The method comprises the steps of receiving a request for a resource from one node of a plurality of nodes in a grid, identifying a resource suitable for satisfying the request and attaching the resource to the grid for use by at least the one of a plurality of nodes for processing one or more applications in the grid.

In another aspect of the invention, a license server for managing resources in grid system is provided. The license server comprises a license profile component for profiling one or more licenses including terms and conditions for one or more resources, a licenses cache for tracking preconfigured licenses and providing improved response time when a request for a license is received and the license is cached and a server profile for maintaining data on available servers and configurations of the one or more resources and for locating a licensed application when a cached license is unavailable, wherein a request for a license is verified by the license profile and an available license is provided in response to the request based on availability from one of the licenses cached and the server profile.

In another aspect of the invention, a system for managing a computational grid is provided. The system comprises means for receiving a license request from a requester in a grid network, means for identifying an available license, means for creating a new operational node and configuring the new operational node to satisfy the license request when currently existing operational nodes are unable to satisfy the license request and means for notifying the requestor of the available license.

In another aspect of the invention, a system for managing resources in a grid computational system is provided. The system comprises a license server for managing the usage of licensed resources in a grid network, the grid network having a plurality of nodes, a backup component for creating and storing images from a master node to a generic node for creating an operational node upon an event, an external resources store for maintaining at least any one of an image and an application for creating operational nodes in conjunction with a request from the licensing server and an external resources dispatcher for providing non-license resources to the grid network in collaboration with the licensing server to maintain a consistent record of available configurations of the plurality of nodes.

In another aspect of the invention, a computer program product comprising a computer usable medium having readable program code embodied in the medium for managing resources in a grid computational system is provided. The computer program product includes at least one component to create one or more generic nodes from a master node by transferring an image to the one or more generic nodes from the master node and transform the one or more generic nodes into one or more operational nodes by sending a configuration update to each of the one or more generic nodes, the configuration update providing information to create a uniquely identified one or more operational nodes within a grid network.

DETAILED DESCRIPTION OF EMBODIMENTS OF THE INVENTION

This invention is generally directed to a system and method for transparently providing a licensing server in a grid network computer system for flexibly managing the addition or removal of resources while complying with licensing usage terms of the resources. Also, the invention provides for adding or removing other resources the grid and is referred to generally as "non-licensed" resources (e.g., processing capacity, storage, memory, certain applications not requiring licenses, etc.) In this way, dynamic adjustments may be achieved in the grid's resources, perhaps due to grid faults or demand changes for one or more applications, while complying with the terms of the associated licenses.

Figure 1:
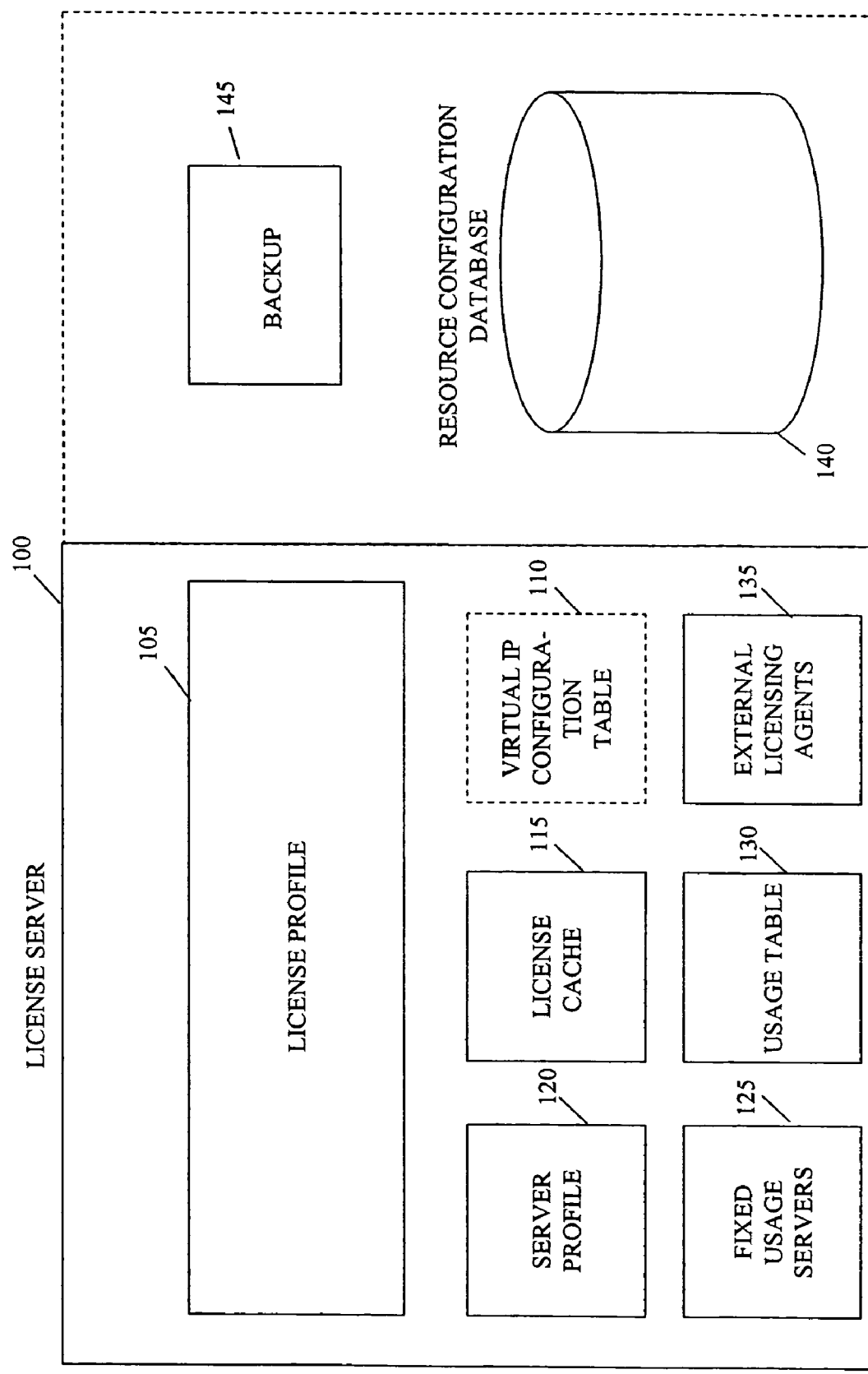
FIG. 1 is a logical block diagram of an embodiment showing components of a license server.

FIG. 1 is a logical block diagram of an embodiment showing components of a license server, according to the invention, generally denoted by reference numeral 100. The license server 100 may be a node in a grid computer network and the logical components 105-140 of the license server 100 may be embodied as one or more software data structures and/or software program codes, as appropriate. The license server 100 may include a license profile component for profiling licenses which contains data that includes information such as licensing terms and conditions for one or more applications. The license profile may also contain how many licenses are available, total licenses owned, and/or type(s) of licenses such as, for example, fixed application license, usage based license, processor based license, and operating system (OS) type, if applicable.

The license server 100 may also include an optional virtual IP configuration table 110 for use during backup and restore operations. By assigning a virtual IP address to a server, the server may be replaced, perhaps due to a fault, with minimal impact by expeditiously assigning the virtual IP address to an alternate or newly configured server, or as otherwise required.

The license server 100 may also include a license cache 115 for tracking preconfigured licenses on servers. The license cache 115 provides for increased response time when a request for a license is received by locating any application to satisfy the request using cache. The license cache 115 also permits an application to be removed after its use. Once a server is cached with a license for an application, the application may be loaded on the server and queued as active.

The license server 100 may also include a server profile 120 which contains a list of all available servers and their resource configurations, e.g., OS, memory, processors, storage, I/O capacity, or other configuration information. The license server 100 may also include a fixed usage server component 125 that identifies fixed licenses that are fixed to a specific server and typically cannot be removed. These fixed licenses usually have a special signature allowing a specific server to use them. Resources with this type of licensing may be limited in availability and may not be subject to dynamic re-assignment.

License server 100 may also include a usage table component 130 (or database) for tracking licenses distributed on a used basis. The usage table component 130 typically tracks when a license is provided to a server and tracks when the license is returned. The usage table component 130 may also track time, computer cycles, disk space, or other similar metrics related to a license usage.

Also included in the license server 100 may be an external licensing agents component 135, typically a table or database. Requests for a license identified in the licensing profile 105 as "external" may be handled through the external licensing agents component 135 which contains configuration information necessary to contact an external licensing server.

The licensing server 100 may also include a resource configuration database 140 that tracks how an application is configured. The configuration database may optionally be associated with the licensing server 100 or operate separately with appropriate communication interoperability with the licensing server 100. For certain embodiments, described below, configuration and image of applications on a server may also be stored as part of the configuration database 140 and maintained in a "ready" state for rapid transfer to another server. For example, images may be maintained so that in the case of a backup/restore scenario, a new image is quickly obtained.

Backup component 145 is also provided and may be either distributed or included as part of the license server 100 to facilitate and control backups of grid nodes. Typically, the backup component 145 performs one-time synchronization backups of master nodes to backup nodes and, thereafter, incremental backups of master nodes to backup nodes.

Figure 2:
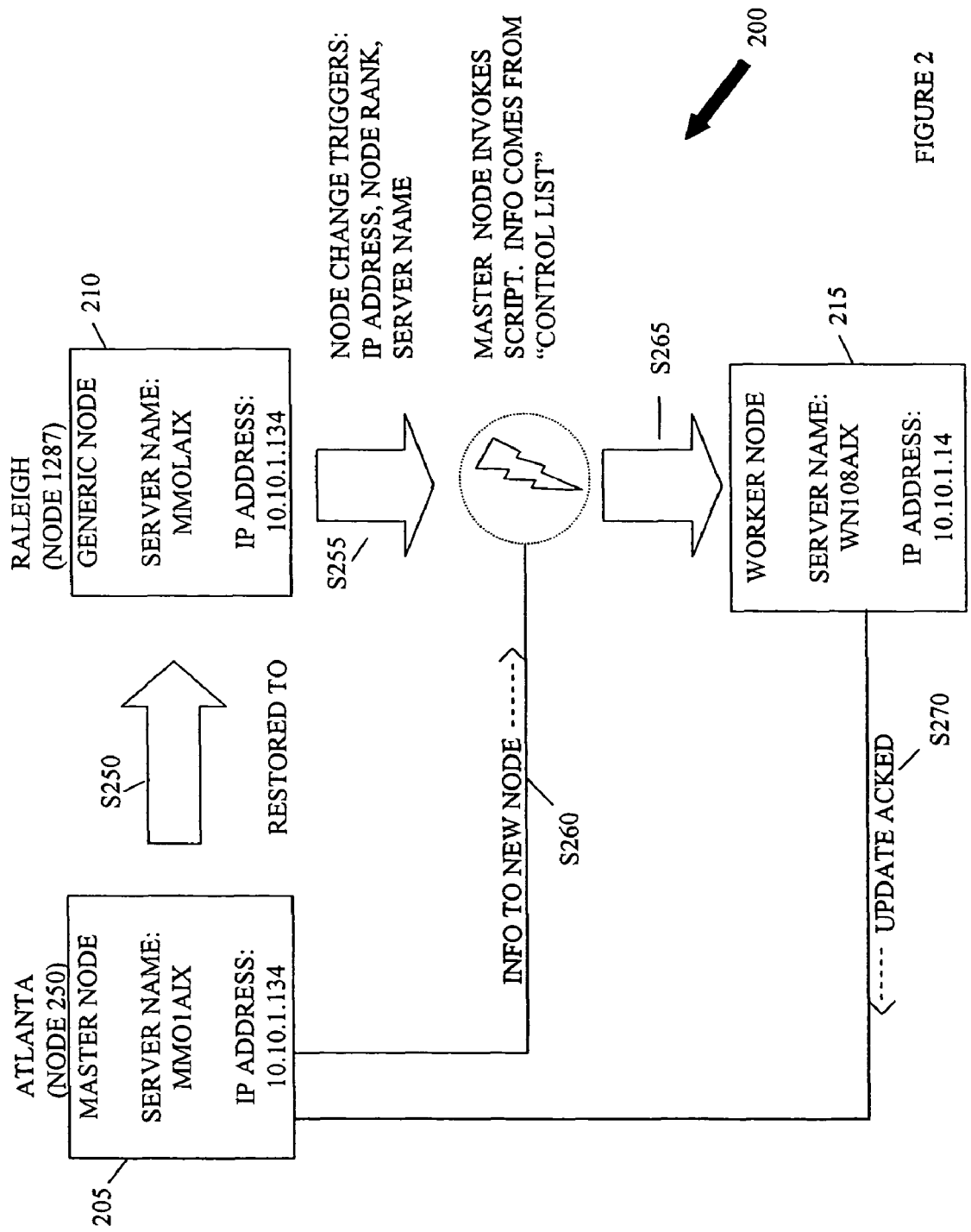
FIG. 2 is a functional block diagram of an illustrative embodiment showing creation of a new node in a grid.

FIG. 2 is a functional block diagram of an illustrative embodiment showing creation of a new node in a grid, generally denoted as reference numeral 200. FIG. 2 also shows various steps for creating the new node. The steps are designated as S250-S270. The creation of a new node may be initiated by the licensing server 100 for a variety of reasons or events such as, for example, providing additional resources for processing one or more applications, performance problems with an existing server, reallocation of resources, backup/restore issues, or the like. Included in this example is a master node 205, labeled as "Atlanta," designated as node 250, server name of "MM01AIX" and having Internet protocol (IP) address of 10.10.1.134. This master node 205 also possesses images of assigned applications and associated configurations.

When licensing server 100 determines that a new node (or a restore of an existing server or node) is necessary, the backup component 145 of licensing server 100 manages the overall process to create or restore a server by using an existing image. At step S250, a generic node 210 may be created by transferring an image from master node 205. Initially, the generic node 210 has the same generic information as the master node 205, for example, same IP address, same server name, etc.

In order to transform the generic node to operational status, the generic node 210 receives new configuration from either the master node 205 or alternatively from the licensing server

100. At step S260, a configuration update is triggered upon successful generic node creation which may be controlled by a configuration script or a control list, e.g., a file or from a universal resource locator (URL). At step S265, the configuration update data supplies new information to the generic node 210 which transforms the generic node 210 into an operational worker node 215. The configuration update information may include, but not limited to, new server name (e.g., WNI08AIX), new IP address (e.g., 10.10.1.14), configuration data for applications, and the like. When the new configuration update information has been successfully received, at step S270, the worker node 215 may acknowledge the receipt of the configuration information. The worker node is now configured to become a part of the operations of the grid. Alternatively, in embodiments, the control list may be included with the image transfer to the generic node (e.g., step S250) so that the configuration update information may be accomplished by the generic node immediately.

The process of FIG. 2 may also provide for generic nodes to be pre-built with pre-determined images and "standing-by" so that reserves of new generic nodes may be created prior to an "urgent" need arising in the grid. In this case, a "standby"generic node may be transformed into an operationally configured worker node by simply sending the control list to the generic node for finalizing configuration parameters, such as IP address (maybe virtual IP address), node rank, application configuration(s), and server name, or the like. The node rank may include it's priority for communicating in some grid based networks. For example, the lower the node rank, the less priority it has to communicate in the grid. Grids that use node ranking need to know where to place the resource in the grid's communication structure. Node ranking can also apply to the rank that a node may have in a functional set of operations if a primary and secondary functional set is required to satisfy a particular need (e.g., Primary SMS server and Secondary SMS server). In this way, the time to bring a new node into service is minimized since the generic nodes have already been pre-configured with a suitable image.

In embodiments, the process of FIG. 2 may also provide for restoring a faulted server. When a server faults, a backup node (e.g., a generic node) may be created (if not already created and "standing by") as previously described. The licensing server may also remove the current faulted server from service by removing a virtual IP address and other network specific configurations (e.g., routes, gateways, DNS servers, etc.) assigned to it. Once the backup server is created or is ready, the license server may assign the virtual IP address and other network specific configurations to the new server which had previously been assigned to the faulted server. The functionality of the original faulted server is now returned to service. This process assumes that the hardware of the new server is the same or comparable to the faulted server which the license server maintains and validates compatibility. If the hardware is not compatible, a request for additional or reconfigured hardware, described below, may be necessary in order to bring the new server on-line with proper functionality.

Figure 3A:
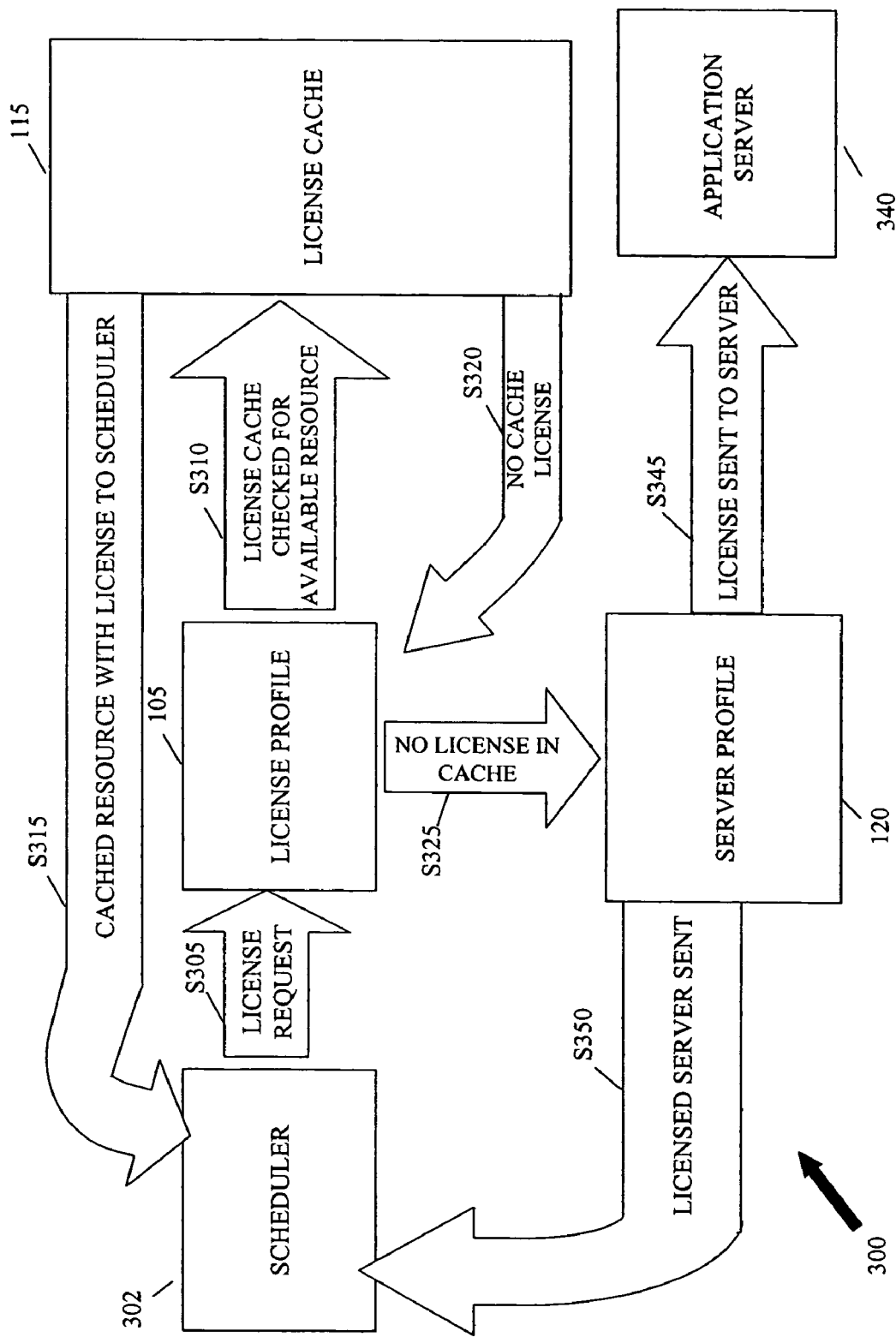
FIGS. 3A and 3B are functional block diagrams of embodiments showing components involved in basic licensing operations.
Figure 3B:
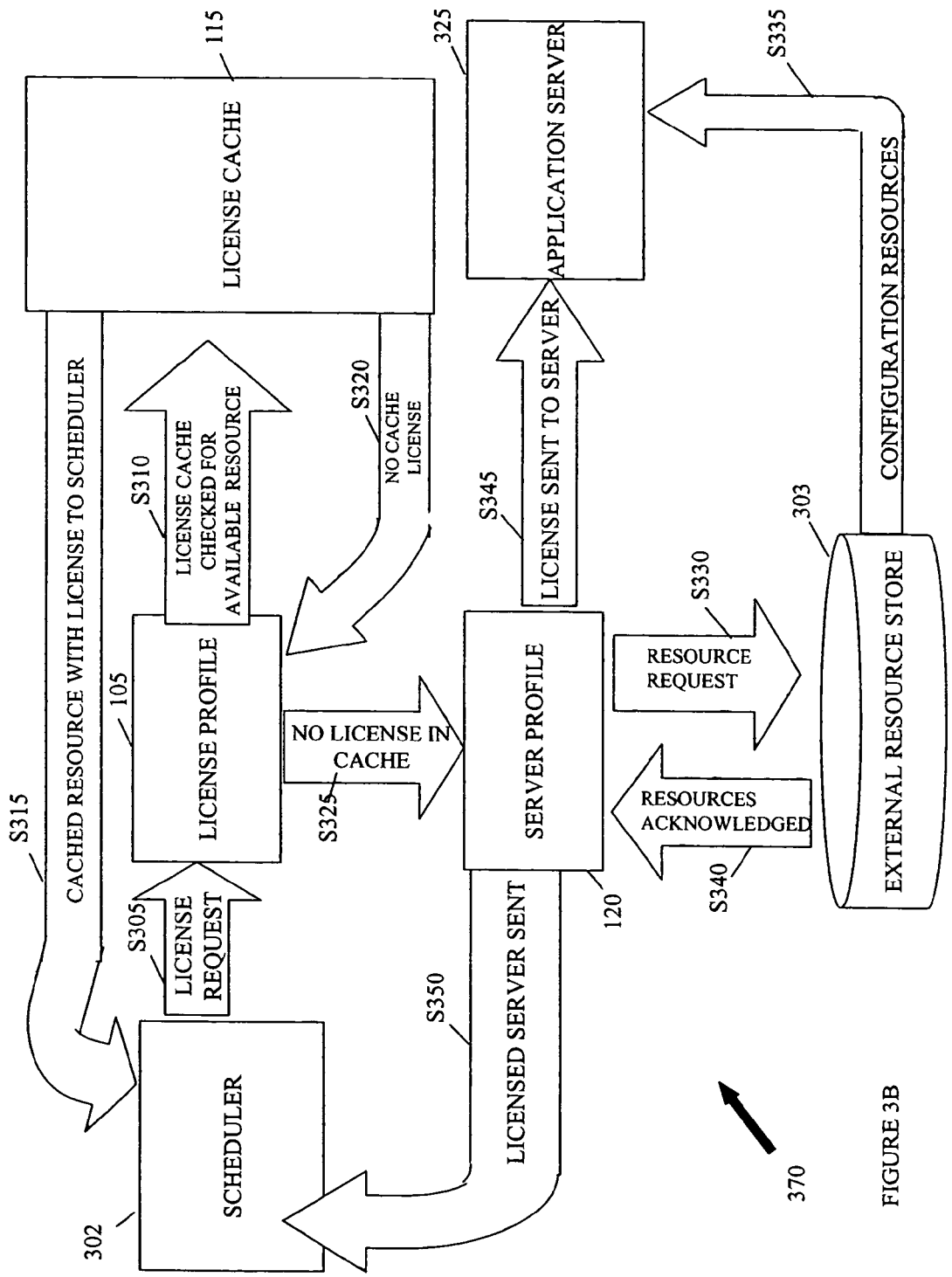

FIGS. 3A and 3B are functional block diagrams of embodiments showing components involved in basic licensing operations, generally denoted as reference numerals 300 and 370, respectively. The functional block diagrams also shows steps of basic licensing operations as denoted by steps S305-S350.

Referring to FIG. 3A, a grid scheduler 150 may receive a request (not shown), typically through a job executing in the grid, which may cause a request for another job or application to execute. In order to schedule the request, at step S305, the grid scheduler 150 interacts with the license server 100 and one or more license server 100 components, such as the license profile 105. In this example, license profile 105 may attempt to locate an available application and verifying that a license is available for an appropriate resource in order to service the request from the grid scheduler 302 with suitable application profile and license.

At step S3 10, the license cache 115 may be checked to ascertain whether a preconfigured license is available and on which server. If there is a license available in license cache 115, then at step S3 1 5, the requested application or resource may be loaded and placed as active, if necessary, and a response may be sent to the grid scheduler 302 indicating that the cached resource is available for use.

If, however, no license is available in cache, then at step S320, an indication is returned to the license profile component 105 indicating that no license is available in the license cache 115. At step S325, the server profile 120 may be consulted to locate and select a server having an appropriate configuration for the request. At step S345, an available license in compliance with the license profile 105 may be sent to the selected configured application server 155 authorizing the license's and application's use. At step S350, a notification is sent to the grid scheduler 302 indicating that the selected licensed server is available and assigned for use. The grid scheduler 302 may now proceed with usual grid application scheduling according to the license information provided by the license server's 100 components.

The embodiment of FIG. 3B is similar to the embodiment of FIG. 3A with like items and steps denoted with the same reference numerals; but, FIG. 3B now includes additional steps S330-S340 and an external resource store 303. Steps S305 and S310 are the same as previously described in reference to FIG. 3A. In the embodiment of FIG. 3B, the server profile 120 may include one or more entries indicating that a particular resource may be available outside the licensing server 100 domain. The external resource store 303 (e.g., one or more servers with an appropriate application and/or image, perhaps under control of another licensing server with another domain) may be accessed to satisfy a grid scheduler request.

Continuing from step S325, when the server profile 120 indicates that a requested resource may be available from an external resource store 303, at step 330, a resource request may be made to the external resource store 303 to discover the availability of the particular resource. The resource request typically includes a destination identifier of where to download the resource (e.g., application server 325). At step S335, if available, an image or requested resource (e.g., an application) may be downloaded to a target application server, i.e., application server 325, if not already downloaded, while honoring licensing criteria for the requested resource. At step S340, an acknowledgement may be returned indicating that the requested resource is available for use (conversely, a negative reply, i.e., unavailable, may indicate that no resource is available when the request cannot be satisfied). Processing may continue with step S345, if a resource is available, where a license may be sent to the application server 325, having been supplied with the appropriate resource from the external resource store 303, if necessary.

The process of FIGS. 3A and 3B also provides for the transfer of configuration data to be sent to the application server before the grid attempts to process any data. Along with a request for a license, the grid scheduler 302 might send a pre-configuration request for certain applications. This may be accomplished by including the pre-configuration request in the original license request. Processor limited applications may also use the resource configuration to configure the application to limit the number of processors the application may split into. Applications that may spawn multiple virtual machines (VM) for each processor might be configured to limit the number of VMs to the number stipulated by the license.

Also, if external agents need to run, an xm1 execution port or expect scripts may execute requested agents, i.e., external executables on the application server. An external agent includes, but is not limited to, network and system monitoring utilities (e.g., Tivoli or NetExpert Monitoring Services), security tools (e.g., Jazz or Patrol), or other non-grid related applications that may be required for the server, but are not required for the actual use of the server on the grid. External agent may include, for example, any external program that is not grid enabled, but may need to be executed on the remote server.

Figure 4A:
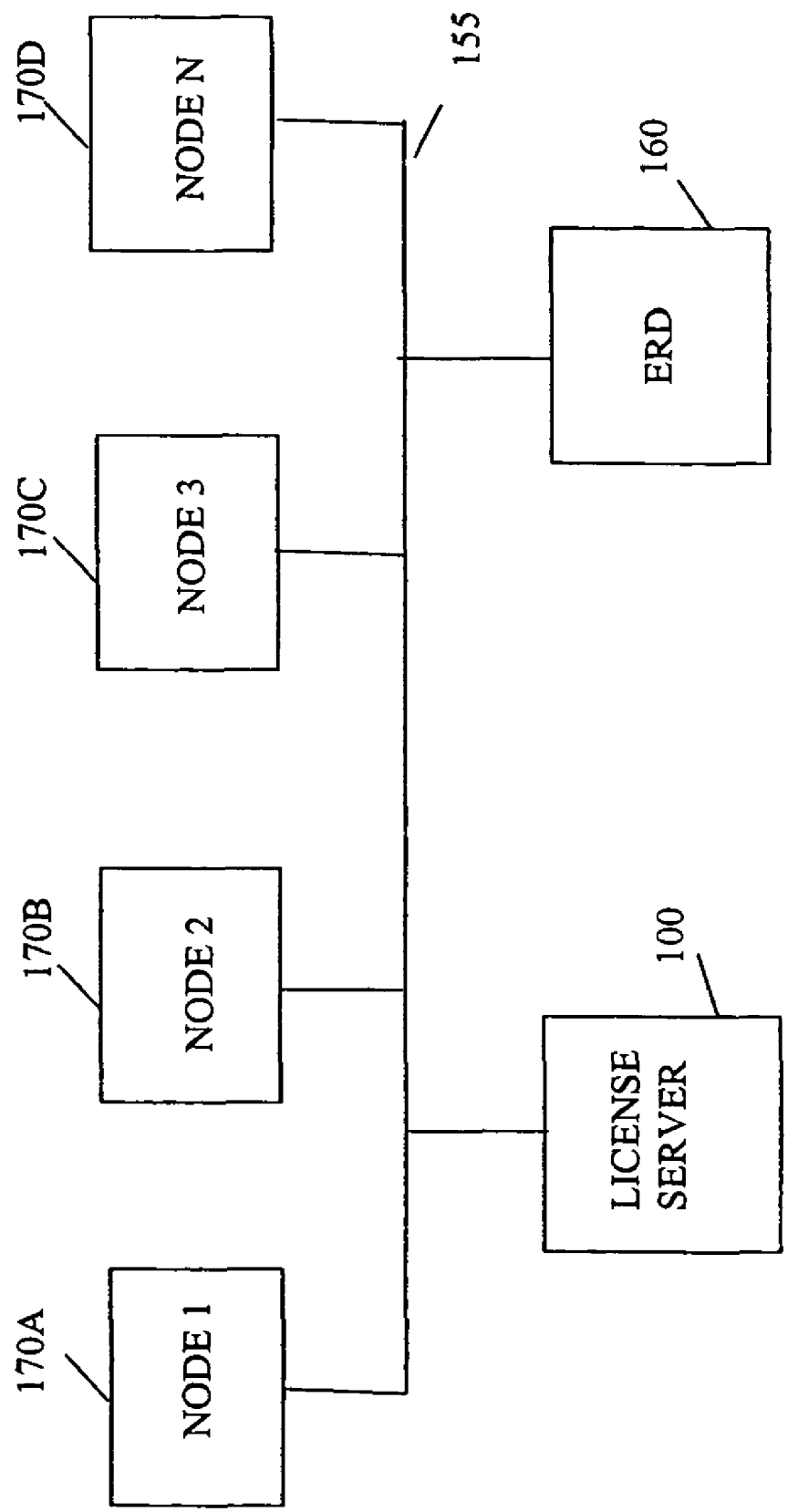
FIGS. 4A and 4B are block diagrams of embodiments of the invention.
Figure 4B:
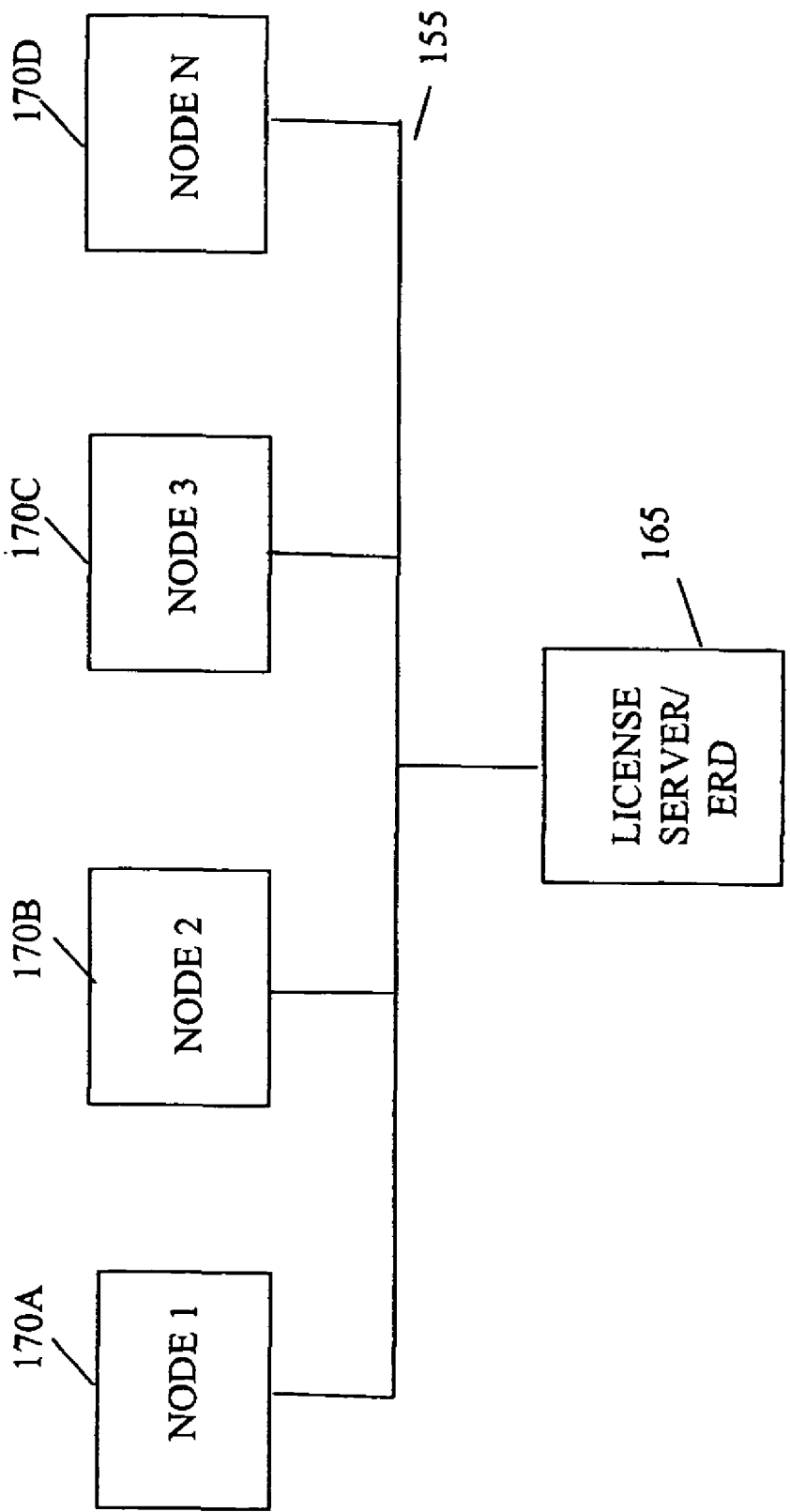

FIGS. 4A and 4B are block diagrams of embodiments of the invention. The embodiment of FIG. 4A includes several components including grid license server 100, an external resource dispatcher (ERD) 160 that is a managing agent for controlling access to external "non-licensed" resources (e.g., hardware capacity such as memory, storage, other computing resources, or applications not requiring a license or metering, and the like), grid nodes 170A-170D and network 155 for interconnected the components. The ERD 160 may manage resources for more than one grid networks.

The ERD 160 also monitors the non-licensed resources and collaborates with the license server 100 (which typically manages licensed resources but is sensitive to hardware configurations or other "non-licensed" resources) to identify and anticipate any external resource that has reached operational limits or a pre-determined threshold. For example, when the grid requires more computing power, a request to the ERD 160 (alternatively, in embodiments, the ERD identifies and determines the need independently and coordinates with the grid license server, perhaps by sending a request for more resources to the licensing server which may acknowledge the request) results in additional computing resources to be added to the grid.

FIG. 4B is similar to the embodiment of FIG. 4A, except the licensing server and ERD functionality are functionally combined as one entity 165, perhaps on the same server.

Figure 5A:
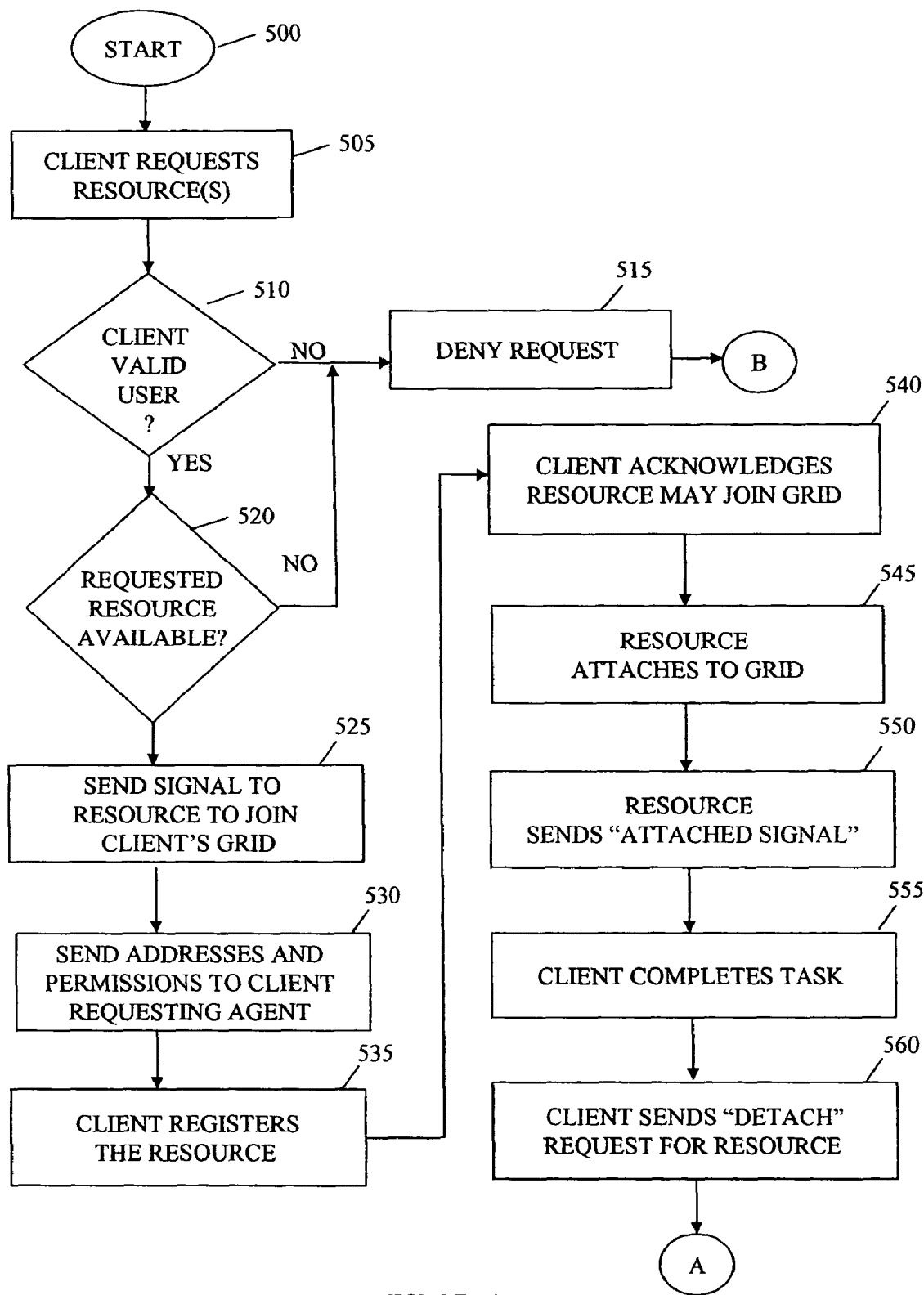
FIGS. 5A and 5B are flow diagrams of an embodiment showing steps of the invention.
Figure 5B:
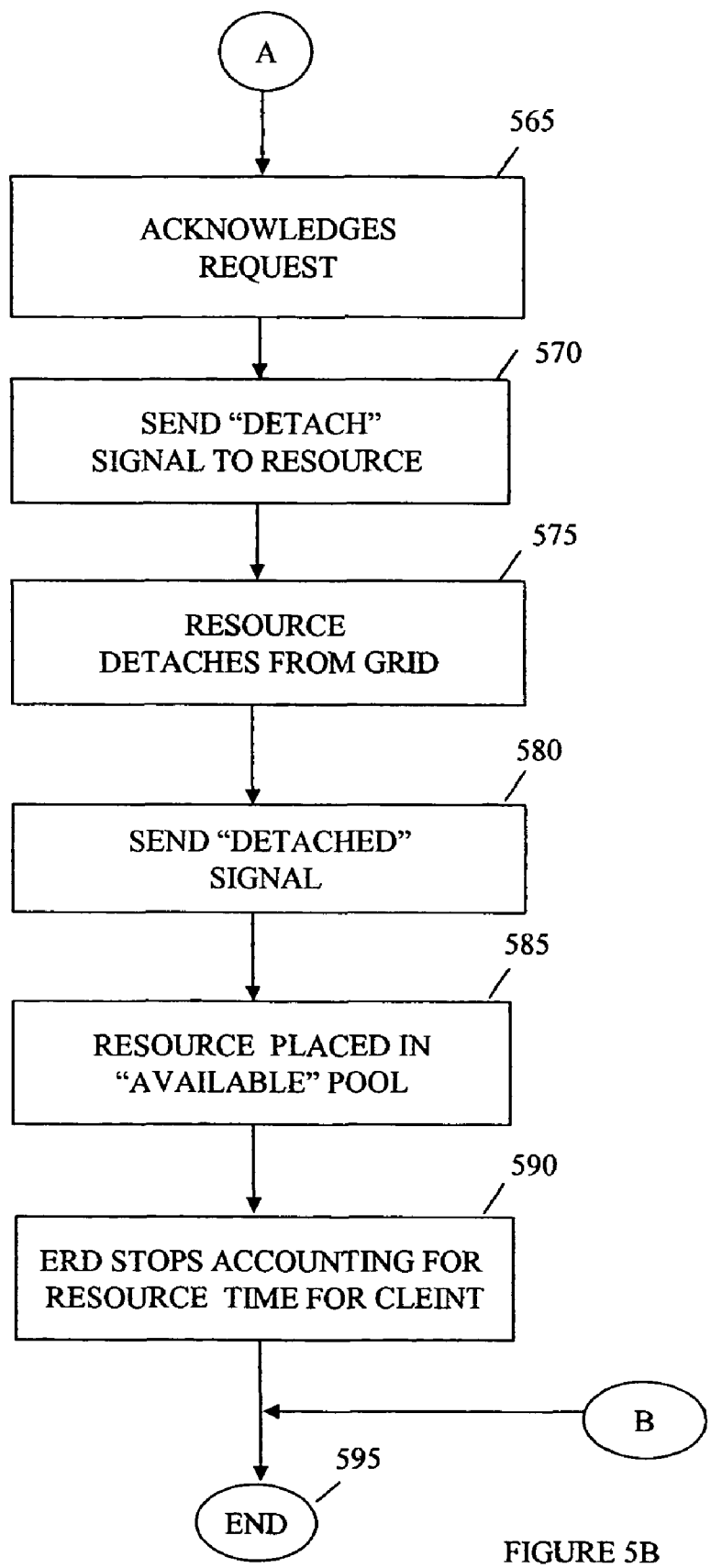

FIGS. 5A and 5B are flow diagrams of an embodiment showing steps of the invention, starting at step 500. FIGS. 5A and 5B may equally represent a high-level block diagram of components of the invention implementing the steps thereof. The steps of FIGS. 5A and 5B (and all other diagrams showing steps) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Continuing with FIG. 5A, at step 505, a client (e.g., a grid node) requests a non-licensed resource (i.e., a resource that does not require management by usage metering, or a resource for which metering is not required according to the terms or implied terms of a license) such as more processing resources, disk storage, memory, an application requiring no license, a physical device, or the like. At step 510, a check is made whether the client is a valid user of the ERD. If not, then at step 515, the request is denied and the process ends at step 595. If, however, the client is valid, then at step 520, a check is made whether the requested non-licensed resource is available. This check may include checking a database for identifying possible resources and associated IP addresses, CPU power, storage ability, memory capacity, rights and privileges of each possible resource, and/or special resources, if any. If the resource is not available, then processing continues at step 515 where the request is denied. However, if the non-licensed resource is available, a signal is sent to the available non-licensed resource for joining the resource to the client's grid at step 525. At step 530, IP addresses and proper permissions may be sent to the client's requesting agent to allow the resource to join the grid.

At step 535, the client registers the non-licensed resource as able to join the grid. At step 540, the client returns a response acknowledging that the resource may join the grid. At step 545, the non-licensed resource attaches to the client's grid. At step 550, the non-licensed resource sends an "attached" signal to the ERD. At step 555, the client completes task involving the previously attached non-licensed resource and determines that the non-licensed resource is no longer required (e.g., falls below a threshold for a period of time or simply no longer needs the resource).

At step 560, the client may send a "detach" signal for the non-licensed resource to the ERD. At step 565, in Figure SB, the ERD may acknowledge the request. At step 570, the ERD may send a "detach" signal to the non-licensed resource. At step 575, the resource may detach from the grid and, at step 580, may send a "detached" signal to the ERD. At step 585, the ERD typically places the resource back into an "available" pool and records that the resource is available for reassignment. At step 590, the ERD stops accounting for time associated with the resource for the client. At step 595, the process ends.

The resulting configurations produced by the ERD may be coordinated with the licensing server to maintain a consistent and current status of resources being added or removed to the grid network. In this way, the licensing server is able to identify candidate servers that may be eligible (e.g., has appropriate hardware profile) to receive new application configurations, for example, to become a new operational node or receive a particular application, based on any resources that the ERD added or removed. The ERD may also be requested to add or remove hardware resources at the request of the licensing server, perhaps based on a network event (e.g., a fault in a server, an immediate lack of resource, a new application request, a capacity threshold being exceeded, a request for more resources and a fault in the grid network or the like).

While the invention has been described in terms of embodiments, those skilled in the art will recognize that the invention can be practiced with modifications and in the spirit and scope of the appended claims.

What is claimed is:

1. A method for managing operations in a grid computing system, comprising the steps of:
    creating one or more generic nodes from a master node by transferring an image to one or more nodes from the master node; and
    transforming the one or more generic nodes into one or more operational nodes by sending a configuration update to each of the one or more generic nodes, the configuration update providing information to create a uniquely identified one or more operational nodes within a grid network.

2. The method of claim 1, wherein the transferring an image step includes sending the configuration update.

3. The method of claim 1, further comprising attaching the one or more operational nodes to the grid network for use by applications within the grid network.

4. The method of claim 1, further comprising the step of acknowledging successful reception of the configuration update.

5. The method of claim 1, wherein the creating step is initiated by a licensing server.

6. The method of claim 1, wherein the configuration update is sent from the licensing server based on an event.

7. The method of claim 6, wherein the event is a request for more resources, a fault in the grid network or a request from an external resource dispatcher (ERD).

8. The method of claim 1, wherein the configuration update is unique to each of the one or more operational nodes and includes at least any one of a unique server name, a node rank, an application configuration and a unique Internet Protocol (IP) address for each of the one or more generic nodes.

9. The method of claim 1, further comprising the steps of: removing a virtual IP address from one operational node of the one or more operational nodes; and reassigning the virtual IP address to another operational node of the one or more operational nodes to quickly cause redirection of processing to the another operational node.

10. A method of acquiring resources in a grid system, comprising:
receiving a request at an external resource dispatcher for a resource from one node of a plurality of nodes in a grid;
identifying a resource suitable for satisfying the request;
attaching the resource to the grid for use by at least the one of a plurality of nodes for processing one or more applications in the grid; and
sending an attached signal from the resource to the external resource dispatcher.

11. The method of claim 10, wherein the external resource dispatcher is a managing agent for controlling access to external resources and the resource is a non-licensed external resource.

12. The method of claim 10, further comprising the steps of:
sending a signal to the resource to join the grid; and
registering the resource at least at the one node of a plurality of nodes.

13. The method of claim 10, further comprising the steps of:
sending a detach signal to the resource;
detaching the resource from the grid;
sending a detached signal to indicate that the resource is no longer attached to the grid; and
recording that the resource is available for reassignment.

14. The method of claim 10, further comprising the steps of:
checking whether the request for the resource was made from a client that is a valid user of the external resource dispatcher; and
checking a database for identifying the resource suitable for satisfying the request, wherein if the client is not a valid user or if the database does not contain a suitable resource, then denying the request.

15. The method of claim 14, wherein the request originates from a licensing server that manages the addition and removal of the resource while complying with licensing usage terms of the resource.

16. A system for managing a computational grid, the system comprising:
a CPU, a computer readable memory and a computer readable storage media;
first program instructions to receive a license request from a requestor in a grid network;
second program instructions to identify an available license;
third program instructions to create a new operational node and configuring the new operational node to satisfy the license request when currently existing operational nodes are unable to satisfy the license request; and
fourth program instructions to notify the requestor of the available license,
wherein the first, second, third and fourth program instructions are stored on the computer readable storage media for execution by the CPU via the computer readable memory.

17. The system of claim 16, further comprising fifth program instructions to send a configuration update to the new operational node to uniquely identify the new operational node or configure an application.

18. The system of claim 16, further comprising: an external resource dispatcher (ERD) for managing and controlling non-licensed resources and for providing the non-licensed resources to the grid network so as to increase capacity and for detaching the non-licensed resources so as to reduce capacity.

19. A system for managing resources in a grid computational system, comprising:
a license server for managing the usage of licensed resources in a grid network, the grid network having a plurality of nodes;
a backup component for creating and storing images from a master node to a generic node for creating an operational node upon an event;
an external resources store for maintaining at least any one of an image and an application for creating operational nodes in conjunction with a request from the license server; and
an external resources dispatcher for providing non-license resources to the grid network in collaboration with the license server to maintain a consistent record of available configurations of the plurality of nodes.

20. The system of claim 19, further comprising means for reassigning a virtual IP address from one of the plurality of nodes to another of the plurality of nodes.

21. The system of claim 19, further comprising means for tracking licenses distributed on a used basis.

22. A computer program product comprising a computer usable storage medium having readable program code embodied in the storage medium, the computer program product includes at least one component to:
create one or more generic nodes from a master node by transferring an image to one or more nodes from the master node; and
transform the one or more generic nodes into one or more operational nodes by sending a configuration update to each of the one or more generic nodes, the configuration update providing information to create a uniquely identified one or more operational nodes within a grid network.

23. A method for deploying computing infrastructure, comprising integrating computer readable code into a computing system, wherein the code in combination with the computing system performs the following:
creating one or more generic nodes from a master node by transferring an image to one or more nodes from the master node; and
transforming the one or more generic nodes into one or more operational nodes by sending a configuration update to each of the one or more generic nodes, the configuration update providing information to create a uniquely identified one or more operational nodes within a grid network.

* * * * *